United States Patent [19]

Untilov et al.

[11] 4,141,483

[45] Feb. 27, 1979

[54] METHOD AND APPARATUS FOR FABRICATING POLYMETALLIC ARTICLES BY SOLID-STATE DIFFUSION BONDING PROCESS

[76] Inventors: Viktor J. Untilov, ulitsa Kazakova, 11; Robert G. Kheifets, ulitsa Kirova, 8, kv. 29; Jury I. Rozengart, ulitsa Fuchika, 14 kv. 11; Viktor Y. Ostrenko, Komsomlskaya ulitsa, 65, kv. 44; Efim A. Reznikov, ulitsa Simferopolskaya, 19, kv. 10; Izrail M. Sukonnik, ulitsa Volnaya, 7, kv. 22.; Jury V. Chichkov, prospekt Geroev, 65, korpus 3, kv. 56; Vladimir I. Oleinik, ulitsa Mayakovskogo, 36; Oleg P. Drobich, Krasny Kamen, 24, kv. 116; Oleg G. Fedorov, prospekt Ilicha, 21a, kv. 15; Vadim N. Morozenko, prospekt Vorontsova, 77, kv. 299, all of, Dnepropetrovsk, U.S.S.R.

[21] Appl. No.: 813,672

[22] Filed: Jul. 7, 1977

[51] Int. Cl.² ............................................. B23K 19/00
[52] U.S. Cl. .................................... 228/193; 13/31 R; 228/243

[58] Field of Search ............................... 228/193–195, 228/243; 13/31

[56] References Cited

U.S. PATENT DOCUMENTS

| 3,116,548 | 1/1964 | Andrus | 228/243 |
| 3,815,219 | 6/1974 | Wilson | 228/193 |
| 4,049,184 | 9/1977 | Rozengart et al. | 228/193 |

*Primary Examiner*—James L. Jones, Jr.
*Assistant Examiner*—K. J. Ramsey
*Attorney, Agent, or Firm*—Fleit & Jacobson

[57] ABSTRACT

The invention essentially resides in that polymetallic articles are fabricated by solid-state diffusion bonding process, whereby the parts of an assembly to be bonded are pressed together as pressure is applied to a high-temperature melt in which this assembly is immersed. The pressing or clamping operation is effected in an apparatus having a thermally insulated tank or container adapted to receive a melt and be sealed. The sealed container is brought in communication with a source for applying pressure to the melt. The thermally insulated tank or container may also be enclosed in a cooled, sealed housing communicating with a space defined by the housing and the container, as well as with the source for applying pressure to the melt.

10 Claims, 2 Drawing Figures

METHOD AND APPARATUS FOR FABRICATING POLYMETALLIC ARTICLES BY SOLID-STATE DIFFUSION BONDING PROCESS

BACKGROUND OF THE INVENTION (1) Field of the Invention

The present invention relates to the field of producing permanent joints between various parts of articles, and more particularly to a method and an apparatus for fabricating polymetallic articles by diffusion bonding process.

This invention is especially well suited for application in aircraft industry, machine-building industry and pipe industry where polymetallic articles are extensively used.

In addition, the invention is readily adaptable for application where it is necessary to provide a reliable and sound bond between two or more heterogeneous metallic materials which have sufficiently high diffusion activity while undergoing concurrent heating.

At present, diffusion welding or solid-state diffusion bonding of metal parts, including those made of heterogeneous metals, finds extensive industrial use owing to the following advantages inherent therein, namely: the joints thus produced show high strength and occupy narrow areas at the surfaces being joined, the structure and properties of metal at the interfitting surfaces undergo but minimum change, the basic parameters of the process (temperature, pressure and time) being easy to control.

(2) Description of the Prior Art

Widely used in the machine-building industry is a method of diffusion bonding in vacuum, effected at normal temperature and providing a high-quality permanent joint between bonded parts of heterogeneous metals. However, this method is complicated to carry out because of the necessity to create high vacuum for the diffusion bonding process if, the metal parts to be joined are firmly pressed or clamped together under high vacuum.

Therefore, apparatus used for carrying out the aforedescribed diffusion bonding process are provided with a vacuum chamber equipped with intricate means for creating high vacuum, and since the metal parts to be joined require considerable force to hold them in sufficiently intimate contact to allow diffusion, this necessitates the use of presses or clamping arrangements to be mounted within said chamber. High clamping pressure is required due to the fact that the process of diffusion bonding is effected in vacuum at normal temperature when the diffusion activity of the atoms of the metals being joined is very low.

It follows that the arrangement of clamping means in the evacuated chamber poses a serious problem of constructional nature, especially where articles of large dimensions are dealt with.

There is known another method of diffusion bonding, wherein heat is used to activate diffusion bonding, said method being extensively employed in the production of tubes from bimetallic and polymetallic materials. This method ensures the provision of a high-quality joint or bond, but necessitates heating of two- or multilayer metal parts in expensive furnaces with an inert or neutral atmosphere (necessary to protect the interfacing metal surfaces from oxidation). Likewise, it requires selection of materials appropriately arranged in layers so that the heat expansion coefficient thereof decreases in value from the inner to the outer layers, thereby providing for natural clamping of interfacing layers one to another.

There is also known a process for diffusion bonding (cf. U.S. Pat. No. 3,815,219, 1974) of an assembly of metal parts, said parts being both held in intimate contact and pressed together by mechanically applied pressure, which comprises preheating of said assembly in a suitable non-metallic, inorganic melt at atmospheric pressure, removing said assembly from said melt, pressing said parts together while hot and coated with the melt material, the coating of melt material protecting said assembly of metal parts from oxidation, reimmersing said assembly in said melt, and further heating it to a temperature at which interdiffusion between said metal parts takes place for a period of time sufficient to provide a satisfactory bond.

The metal parts to be diffusion bonded are joined and held in intimate contact, prior to being immersed in the melt, either by twisting thereof (in case of a wire), or by spot-welding of metal blocks clamped together by means of a mechanical or hydraulic press, or else by riveting said metal parts, the heat expansion coefficient of the rivet material being less than that of metals from which are fabricated the parts being bonded.

When the assembly of metal parts is removed from the high-temperature melt, it is subjected to rolling between working rolls to clamp the parts one to another (provided the assembly or article is simple in shape), or else said metal parts are subjected to a forge rolling operation.

The rolling or pressing of metal parts coated with the melt causes sticking of the latter to the working surfaces of such rolling or pressing units, thus necessitating the removal of the increasing layer of the melt material therefrom to avoid flaws or defects in the articles being worked on in such installations.

Moreover, the reduction or deformation of the metal parts coated with the film of said melt will invariably cause destruction of the film which protects the article and interfacing surfaces thereof from oxidation. The oxidation of said interfacing surfaces will either render the diffusion bonding process inoperative or considerably impair the quality of the bond due to the presence of oxidized films on the surface of the metal parts being joined together.

In order to eliminate the possibility of oxidation of the interfacing surfaces, it is necessary to provide the largest possible area whereupon interdiffusion between the preheated metal parts takes place. This, however, is possible only if the preheating cycle, and hence the entire operating process of diffusion bonding, is extensively long. In addition, special joining means are required for holding the metal parts together in intimate contact, for example, the aforedescribed means in the form of rivets fabricated from material whose heat expansion coefficient is lower than that of metals used for the parts being bonded.

The fact that the metal parts are exposed to the air and pressed or clamped to one another by means of a working tool having a temperature substantially lower than that of said parts, causes a sharp decrease in temperature of the assembly of metal parts and diminishes the deformation effect due to the interdependence between the diffusion activity and temperature. This relationship is governed by the parabolic law.

Therefore, said diffusion activity goes sharply down together with the falling temperature of said parts.

In view of inadequate workability of the metal parts in the air, said parts are reimmersed after deformation in the high-temperature melt for a long period of time to thereby strengthen the diffusion bonding therebetween, effected by preheating and subsequent mechanical treatment thereof.

Fluctuations in temperature of the assembly of metal parts, while being exposed to the air or subject to mechanical treatment, cause impairment of the metal structure in the bonding area, which becomes non-uniform in grain-size, especially in cases when one of the metal parts being bonded is made of austenite steel.

Where it becomes difficult to remove the assembly from the melt because of its thickness or to clamp the parts of said assembly together in the air, the clamping or pressing operation required for diffusion bonding is carried out by mechanical means directly in the melt at the high melt temperature.

However, the assembly operation according to the method described above is an exacting one since the assembly of metal parts and a clamping means should be disposed in a precise mutual relationship in the melt container which tends to be bulky because of this. In case this precise mutual arrangement is effected prior to immersing said assembly and clamping means in the melt, the pretreatment of the assembly of metal parts to be diffusion bonded is thus rendered difficult.

From the above, it follows that the prior-art method of diffusion bonding is of limited utility since it is incapable of providing diffusion bonding of complex-shaped, multilayer cylindrical articles, such as tubes, due to the impossibility of effecting mechanical clamping of metal parts of such an article, or because of the difficulty of operating said clamping means having working components of sophisticated designs.

Where the solid-state diffusion bonding process is used for fabricating articles made of metals showing high diffusion activity at the process temperature, it is sufficient to immerse the assembly of metal parts being bonded in the high-temperature melt without clamping said parts together either within the melt container or in the air.

As follows from the patent referred to above, the time period during which the immersed assembly remains in the melt container is 20 to 30 hours.

An apparatus for carrying the aforedescribed solid-state diffusion bonding method into effect is formed of a melt container arranged within a thermally insulated housing and heated by any convenient source of heat. Where it is indispensable to effect clamping of the metal parts within the melt container, any suitable clamping arrangement, such as a mechanical or hydraulic press, is mounted above the container to provide intimate contact between the interfaces of said metal parts.

When the clamping operation is effected during the removal of said parts from the melt container, a clamping arrangement (pressure rolls, press or forge machine) is mounted in close proximity with the container to bring the loss of temperature of the article to minimum.

The aforedescribed disadvantages of the prior-art diffusion bonding method narrow the scope of its application.

The primary object of the present invention is to provide a method and an apparatus for fabricating polymetallic articles by the diffusion bonding process, which will make it possible to reduce the time for pretreating an assembly of polymetallic parts being bonded.

Another object of the invention is to provide a method and an apparatus which will allow an increase in the variety range of articles being bonded.

SUMMARY OF THE INVENTION

These and other objects of the invention are accomplished by the provision of a method for fabricating polymetallic articles by the diffusion bonding process, comprising the steps of joining metal parts to be bonded, holding said parts in intimate contact, immersing said assembly of parts in a high-temperature melt, heating it therein and pressing together to allow diffusion bonding thereof, wherein, according to the invention, said pressing or clamping operation is effected by way of applying pressure to said melt.

With the clamping operation being effected by applying pressure to the melt, wherein pressure is distributed uniformly in all directions, the interfitting metal parts held in intimate contact undergo, regardless of their shape or mutual arrangement, uniform pressure throughout the heating cycle while the parts being heated remain in the high-temperature melt. As a result, it takes less time to carry out the diffusion bonding process which provides for a reliable and sound bond in the articles thus produced. Also, the production variety range is extended.

It is possible to apply water vapour pressure to the melt.

In case of vapour condensation, a compressed gas pressure should preferably be applied to the melt.

Taking into account that the melt protects the article being bonded from oxidation in the course of heating, it is advisable to apply compressed air pressure to the melt.

It is advantageous that a clearance be provided between the interfaces of metal parts held in intimate contact before said parts are immersed in the high-temperature melt, said clearance being sufficiently small to prevent any penetration of the melt material therebetween. The amount of clearance depends upon the viscosity of the melt and the pressure acting thereupon.

If, however, the melt could penetrate between the interfitting metal parts due to low viscosity of said melt, the assembly of said metal parts should be joined together in a fluid-tight manner throughout the perimeter of the interfacing surfaces thereof.

The object of the invention is likewise attained in an apparatus comprising a container or tank containing a high-temperature melt and provided with a heater to maintain a prescribed temperature, as well as with a heat insulation, wherein, according to the invention, the container is sealed and brought in communication with a means for applying pressure to the melt.

The construction of the proposed apparatus enables effective pressure to be applied to the melt, and, consequently, to the assembly of parts of polymetallic articles being diffusion bonded, thereby decreasing the time of the diffusion bonding process and increasing the variety of articles produced by said process.

It is preferable that the melt container be made cylindrical in shape and provided with a cover having mounted therein a means for applying pressure to the melt, arranged interiorly of the container. Such container construction is suitable when vapour pressure is applied to the melt.

The means for applying pressure to the melt, arranged interiorly of the container, should be formed of a closed metal vessel, viz., an accumulator having in its upper portion openings which communicate said accumulator with the container interior space connected through a pipe with a water supply system fixed in the container cover. Such manner of using the means for applying pressure to the melt makes it possible to provide heating of the accumulator directly from the melt. Also, vapour is generated from water contained in the cover in an amount sufficient to establish a requisite pressure to be applied to the melt. The provision of the branch pipe fixed in the container cover and connecting the accumulator with the water supply source, enables a requisite amount of water to be supplied to the most heated sections of the accumulator (closely adjacent to the melt). The openings provided in the upper portion of the accumulator and communicating the latter with the container interior serve to direct a flow of water vapour straight to the container interior with the melt therein, thus enabling the vapour pressure to be applied to the surface of said melt.

It is likewise possible to place the melt container within a water-cooled, sealed housing and bring the space defined by the housing and the container, as well as the container interior, in communication with the means for applying pressure to the melt. This being the case, the container shell will undergo equal outer and inner pressure, the inner pressure being absorbed by a solid, outer water-cooled housing wall, which makes for substantially higher pressure applied to the melt. This will additionally cut down the time required to obtain a permanent bond of high strength in the articles produced by the diffusion bonding process.

Since the melt container is enclosed in the water-cooled housing, it is expedient that said housing be sealed and cylindrical in shape, as well as provided with a cover through which the housing interior is brought in communication with the means for applying pressure to the melt.

When compressed gas pressure is applied to the melt, a high-pressure air compressor should be preferably used as the means for applying pressure to the melt.

The invention will now be explained in greater detail with reference to embodiments thereof which are represented in the accompanying drawings.

DESCRIPTION OF THE INVENTION

Figure 1:
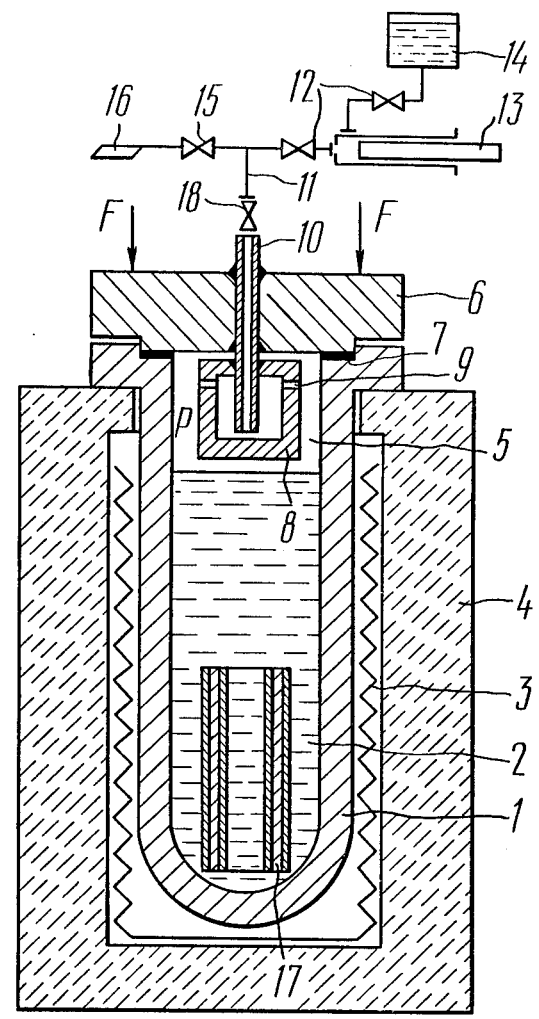
FIG. 1 is a general longitudinal view of an apparatus for fabricating polymetallic articles, according to the invention, wherein vapour pressure is applied to a melt.

There is proposed herein a method for fabricating polymetallic articles by a diffusion bonding process, which contemplates the steps of joining metal parts to be bonded, holding said parts in intimate contact, immersing the assembly of said parts in a high-temperature melt, heating it the assembly therein and pressing it together to allow diffusion bonding through contiguous surfaces of said parts.

The surfaces of metal parts to be bonded are usually prepared prior to the bonding process by means such as mechanical and chemical treatment (etching or degreasing).

Thereafter, the metal parts are joined by conventional means. Where cylinder-shaped articles (tubes) are to be fabricated, the assembly thereof is carried out by introducing one into another the cylindrical parts of such an article through a deforming ring, or by squeezing the assembly of said parts through a taper stopper. The selection of an appropriate technique of holding the metal parts in intimate contact is governed by the fact that the assembly of metal parts undergoes deformation at the side thereof having low strength and high plasticity.

If the length of a cylindrical article is in excess of 500 mm, the aforedescribed techniques of holding the metal parts in intimate contact are at times impossible to carry into effect by reason of insufficient longitudinal stability. The usual practice in the case like this will be to introduce the cylindrical parts of such articles (tubes) one into another, whereupon one of the ends thereof is substantially reduced in diameter by cold forging, said assembly undergoing thereafter sink drawing.

The hereinabove described techniques of holding the parts of a cylindrical article in intimate contact rule out the use of a lubricant which, if entrapped even in a negligible amount between the interfitting surfaces, renders them unsuitable for diffusion bonding process.

It is advisable to apply a thin film of dry soap or flaked graphite to the surfaces of metal parts within a distance of 10 to 20 mm from the ends thereof which are first to undergo deformation under the action of a working tool adapted to provide intimate contact between said metal parts.

If polymetallic articles to be produced by the diffusion bonding process have any other shape but cylindrical, i.e., plates, sheets or complex-shaped blocks, such articles are joined mechanically, as by bolts, screw clamps or rivets made of a metal or alloy with the heat expansion coefficient thereof being lower than that of the material of the metal parts being bonded.

The metal parts to be immersed in the high-temperature melt should be free from both oil and water, the presence of which may cause splashing of the melt.

In accordance with the invention the clamping operation is effected by applying pressure to the melt.

The pressure applied to the melt is either water vapour or compressed gas pressure.

The use of water vapour pressure applied to the melt is easy to carry out and economical. To establish high vapour pressure, it is sufficient to have a small amount of water from which vapour is formed, since the volume of vapour may exceed by 1.5 to 2.5 thousands the volume of water from which it has been formed. It is to be noted that all the surfaces the vapour is brought in contact with should be heated to a high temperature to avoid precipitation or vapour condensation, resulting in lower pressure applied to the melt.

In those cases when a medium, used for establishing pressure to be applied to the melt, is brought in contact with cold or inadequately heated surfaces, it is good practice to use compressed gas pressure instead of water vapour.

For example, compressed air may be used as the compressed gas. Owing to the protective anti-oxide effect of the high-temperature melt, the oxygen contained in the air is prevented from penetrating the melt and oxidizing the interfaces of the metal parts being bonded.

The use of compressed air is more economical as compared to any other compressed gas having the same pressure.

Prior to immersing in the high-temperature melt, the metal parts of an assembly being bonded are held together in intimate contact so that there is provided a clearance between said parts, small enough to prevent any penetration of the melt material therebetween.

The selection of the maximum permissible clearance varies from case to case, depending upon the melt flowability, the process temperature and pressure applied to the melt. It is understood that the thicker the melt used for heating the assembly, the larger the clearance may be between the interfacing parts of the assembly.

In those cases when the melt has appreciable flowability, or else in the case of cylindrical or tubular articles, the heat expansion coefficient of the outer layers thereof being higher than that of the inner ones, the metal parts of such articles are prone to form an inadmissably large clearance while being heated. Therefore, to avoid this deficiency, said parts are joined together in a fluid-tight manner throughout their interfitting surfaces prior to being immersed in the high-temperature melt.

Such fluid-tight joining is effected by way of electric welding, and provided the metal parts of said assembly are made of fusible metals, high-temperature sealings can be readily used for the purpose.

The herein proposed method enables the basic process parameters to be varied over a wide range, thus being readily adaptable for extensive application.

The requisite temperature of the melt, for example, is ensured by an appropriate selection of its composition on the basis of the fusion temperature on the one hand, and on the basis of boiling and evapouration temperature, on the other. A wide choice of the melt compositions makes for the temperature conditions required by the majority of ferrous and nonferrous metals. Insofar as refractory metals and alloys are concerned, the possibility of fabricating articles therefrom by the diffusion bonding process is mainly governed by high-temperature strength capability of materials used for the construction of apparatus adapted to carry out the method of the invention.

In FIG. 1 there is illustrated an apparatus for carrying the proposed method into effect, which apparatus comprises a container 1 for a high-temperature melt 2, provided with a heater 3 adapted to maintain a prescribed temperature of the melt 2, as well as with a heat insulation 4. According to the invention, the container 1 is sealed and brought in communication with a means for applying pressure to the melt 2.

The container 1 for the high-temperature melt 2 is made of refractory steel or alloy and has a wall thick enough to withstand pressures developed within the interior 5 of the container I at a prescribed temperature of the process.

It is advisable that the heater 3 should be of electric type, though gas heating is likewise applicable.

The material and thickness of the heat insulation 4 is selected on the basis of the requirement to maintain a temperature at the outer surface of the apparatus of not more than 80° C. The container 1 for the melt 2 is cylindrical in shape, which provides maximum strength and convenience for tight sealing thereof, said container also having a cover 6. There is provided between the body of the container 1 and the cover 6 a packing 7 of a heat-resistant material. The cover 6 is clamped tight to the container 1 by any convenient means capable of providing a requisite clamping force, such as hydraulically driven leverage means (not shown).

Mounted in the cover 6 on the side thereof facing the interior 5 of the container 1 is a means for applying pressure to the melt 2. This presure applying means is formed of a metal accumulation vessel 8 fitted with openings 9 which communicate said accumulation vessel with the interior 5 of the container 1, said vessel being connected through a branch pipe 10 fixed in the cover 6 with a water supply system 11.

The accumulation vessel 8 is made thick-walled to be capable of accumulating adequate amount of heat which it absorbs from the melt 2.

A fluid-tight fixture of the branch pipe 10 in the cover 6 is provided by means of welding said pipe to the cover 6.

The water supply system 11 consists of valves 12, a water pump 13 adapted to provide a rated supply of water under pressure, and a water supply tank 14 intended for filling the pump 13.

The branch pipe 10 is connected with a valve 15 permitting the outlet of vapour from the interior 5 of the container 1, the valve 15 being connected with a vapour outlet pipe 16.

The metal parts of an assembly 17, selected on the basis of appropriate characteristics of their interfitting surfaces, are joined by any means in the manner described above to be thereby held in intimate contact, whereupon said assembly of metal parts is immersed in the high-temperature melt 2 contained in the container 1 with the cover 6 thereof being open, said melt being held at a prescribed temperature by means of the heater 3. Then, the assembly 17 of the metal parts being bonded undergoes heating. The cover 6 is closed and tightly clamped through the packing 7 to the container 1 with a clamping force F (acting on both sides of the cover 6 as schematically illustrated in the drawings), the value of which should exceed by 1.25 to 1.5 that of the pressure force acting on the cover 6 from the side of the interior 5 of the container 1 under working pressure 2 in the interior 5.

As the container 1 is closed with the cover 6 and the interior 5 is sealed, the accumulator is heated while absorbing heat from the melt 2. The water pump 13 is filled with water passing from the water supply tank 14 whereupon the rated amount of water is supplied through the valves 12 and 18, and through the branch pipe 10 to the accumulation vessel 8, said valves being afterwards shut off. Once on the heated interior surface of the accumulation vessel 8, the water forms into vapour which passes through the openings 9 into the interior 5 of the container 1. The use of the accumulation vessel 8 makes it possible to substantially increase the pressure applied to the melt 2 by way of changing the state of aggregation of water without resorting to additional sources of power since the accumulation vessel 8 is sufficiently heated by the heat from the melt 2 to enable evapouration of water delivered to the accumulator 8 by the pump 13.

The pressure in the interior 5 increases from atmospheric to that required for the diffusion bonding process and, according to Pascol's law, is applied unchanged to each point of the high-temperature melt 2. Consequently, the vapour pressure P which develops in the interior 5 of the container 1, acts accordingly on all the surfaces of the metal parts of the assembly 17 being bonded.

Due to the fact that the metal parts of the assembly 17 are joined together in accordance with the aforedescribed techniques so as to prevent the penetration of the melt 2 between the interfitting surfaces thereof, the assembly 17 undergoes the action of the force acting thereupon from the side of the surfaces in contact with the melt 2, that is the force which acts to clamp the joined metal parts close together.

The clamping of the metal parts, heated to such a temperature as to cause diffusion of the atoms of one or both metal parts into the other held under pressure for a prescribed length of time, results in a strongly bonded polymetallic article 17 obtained by solid-state diffusion bonding of its parts. The pressure, temperature and hold time under pressure vary with the particular metal or combination of metals, and, depending upon specific dimensions of the articles to be fabricated, are determined by test and trial.

On completion of the hold-time-under-pressure cycle, the valves 18 and 15 are opened and the vapour is released through the pipe 16, the pressure in the interior 5 being thus brought back to atmospheric. Thereafter, the cover 6 is opened to allow the removal of the polymetallic article 17 from the high-temperature melt 2. The melt material is washed off the surface of said article with running water.

In view of the fact that the container 1 of the herein described apparatus is under inner pressure, and because of the difficulty of ensuring sufficient strength of the container body exposed to high temperatures, it is advisable to run the process by means of such apparatus in conformity with the following process parameters, namely:

| | | |
|---|---|---|
| dimensions of the assembly being bonded | — | length, not more than 500 mm diameter, not more than 50 mm |
| maximum pressure during bonding | — | 100 kg/cm$^2$ |
| maximum temperature of the melt | — | 1000° C. |
| duration of bonding process | — | from 1 to 15 min. |

When the apparatus of the invention is used for fabricating polymetallic articles from metals susceptible to bonding at a temperature of about 500° (aluminium, manganese and alloys thereof), that is at the melt temperature of 500° C., the potentialities of such apparatus with regard to both the maximum permissible pressure and dimensions of the assembly will substantially surpass those mentioned above.

Figure 2:
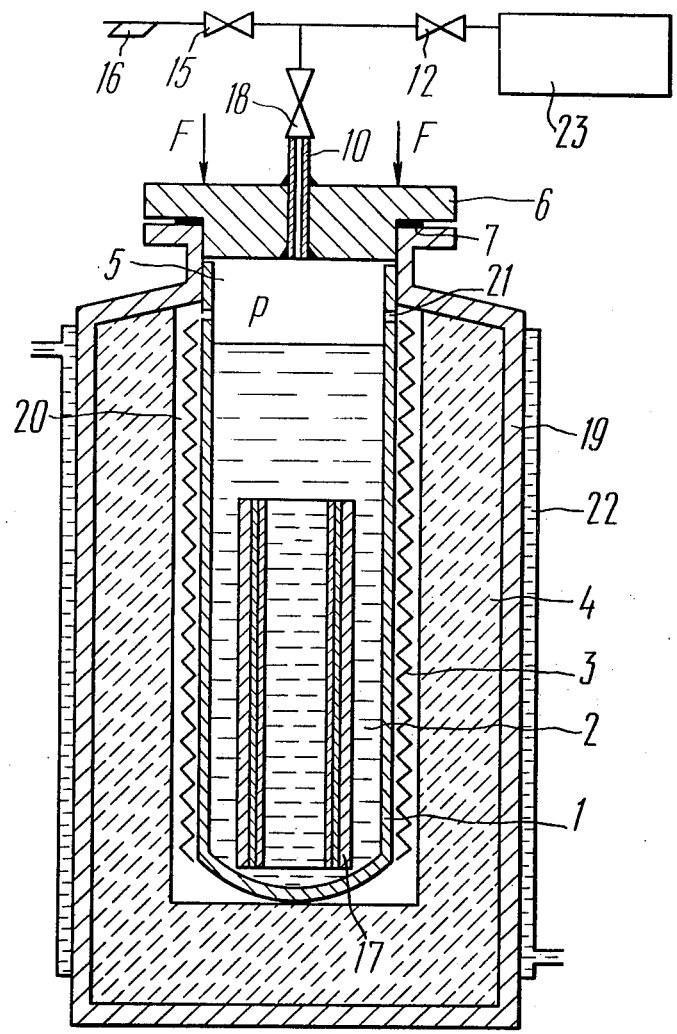
FIG. 2 is a general longitudinal view of an apparatus for fabricating polymetallic articles, according to the invention, wherein compressed gas pressure is applied to a melt.

With the purpose of widening the scope of application of the herein proposed method, there is provided an apparatus for carrying out said method, which apparatus, as shown in FIG. 2, comprises a container 1 for a high-temperature melt 2, a heater 3 adapted to maintain a prescribed temperature of the melt 2, and a heat insulation 4. According to the invention, the container 1 for the melt 2 is mounted within a water-cooled, sealed housing 19 and brought in communication with a space 20 defined by the housing 19 and the container 1, as well as with a means for applying pressure to the melt.

The upper portion of the container 1 is formed with openings 21 which communicate the interior 5 of the container 1 with the space 20 defined by the housing 19 and the container 1, whereby the container 1, provided the melt 2 is under pressure, because free from the effect of inner pressure to remain only under the action of hydrostatic head of the melt, which is why said container is made thin-walled. Because of this, the control over the temperature of the melt 2 is substantially improved and the time required for heating the apparatus is reduced.

In this case it is the water-cooled housing 19 which undergoes the action of inner pressure. The cooling of said housing may be effected by means of a water jacket 22. By using the melt 2 having a temperature of about 500° C., said cooling may be effected by means of air blowing. By virtue of the fact that the temperature of the housing 19 does not exceed 50°–80° C., it is capable of withstanding considerable inner pressure.

In this case it is the cooled housing 19 which is sealed and not the container 1.

The cooled and sealed housing 19 is cylindrically shaped to gain maximum strength, said housing being fitted with a cover 6 through which the interior 5 of the container 1 for the melt 2 is brought in communication with the means for applying pressure to said melt. The space 20, defined by the cooled housing 19 and the container 1, is likewise in communication with the means for applying pressure to the melt due to the provision of openings 21.

The clamping of the cover 6 to the housing 19 is effected by any convenient means, such as hydraulically driven leverage means (not shown in FIG. 2).

A high-pressure air compressor 23 is used in the disclosed embodiment as the means for applying pressure to the melt 2. The use of a more simplified water vapour pressure means for applying pressure P to the melt 2 is impractical in this instance because of the water vapour condensation which takes place on the inner wall surface of the housing 19.

Interposed in the compressed air supply system of the compressor 23, extending into the interior 5 of the container 1, is a valve 12 which functions to shut off the compressor 23, a valve 18 shutting off the container 1 with the melt 2, the pipe 10 being fitted in the cover 6.

Mounted in the gas discharge system is a valve 15 and a gas outlet pipe 16.

The housing 19 is tightly closed with the cover 6 by means of a packing 7 of a heat-resistant material, whereas the tight fixture of a branch pipe 10 in the cover 6 is achieved by welding said pipe to the cover 6.

The metal parts of an assembly 17, selected on the basis of appropriate characteristics of their interfitting surfaces, are joined by any means in the manner described above to be thereby held in intimate contact, whereupon said assembly of metal parts is immersed in the high-temperature melt 2 contained in the container 1 with the cover 6 thereof being open at the time, the prescribed temperature of said melt being maintained by the heater 3. Thereafter, the assembly 17 of the metal parts being bonded undergo heating.

The cover 6 is then closed and tightly clamped through the packing 7 to the housing 19 with a clamping force F, the value of which should exceed by 1.25 to 1.5 that of the pressure force acting on the cover 6 from the side of the interior 5 of the container 1 under working pressure P in the interior 5.

Then, with the valves 12 and 18 being open, a compressor 23 is actuated to deliver compressed air to the interior 5 of the container 1, and through openings 21 to the space 20 defined by the cooled housing 19 and the container 1. On establishing a prescribed air pressure applied to the melt 2 to thereby promote bonding process (taking into account the possibility of additional heating of said melt and further increase in pressure), the valves 12 and 18 are closed to thereafter effect the succeeding operation of holding the immersed asssembly under pressure for a prescribed time interval.

The compressed air pressure P, created in the interior 5 of the container 1 and in the space 20, defined by the housing 19 and the container 1, acts on the melt 2 and through it on all the surfaces of the assembly 17 being bonded.

The joining of the metal parts of the assembly 17 is carried out in accordance with the aforedescribed techniques to prevent the penetration of the melt 2 between the abutting surfaces of said parts.

Therefore, acting on the assembly 17 is only the force coming from the side of the surfaces in contact with the melt 2, that is the force which acts to clamp the joined metal parts one to another.

The clamping of the metal parts, heated to such a temperature as to cause diffusion of the atoms of one or both metal parts into the other while being held under pressure for a prescribed length of time, results in a strongly bonded polymetallic article 17 obtained by diffusion bonding of its parts.

The pressure, temperature and hold-time under pressure vary with the particular metal or combination of metals, and, depending upon specific dimensions of the articles to be fabricated by diffusion bonding process, are determined by test and trial.

On completion of the hold-time under pressure, the valves 18 and 15 are opened to allow the escape of the compressed air through the pipe 16, with the pressure in the interior 5 and in the space 20 between the housing 19 and the container 1 going back to atmospheric.

The cover 6 is then opened to allow the removal of the polymetallic article 17 from the melt 2. The melt is washed off the surface of said article by means of running water.

Due to the fact that the container 1, incorporated in the proposed apparatus, is free from the action of inner pressure which is absorbed by the sturdy water-cooled housing 19, the basic parameters of the process carried out by such apparatus will be substantially improved as compared to those described hereinabove. The technique of applying compressed air pressure to the melt is, however, more complicated than that of applying water vapour pressure.

Given herein below are the basic parameters of the process wherein compressed air pressure is used.

| Dimensions of the assembly being bonded | — length, not more than 2000 mm diameter (width) not more than 200 mm |
|---|---|
| Maximum pressure during bonding | — 200 kg/cm$^2$ |
| Maximum temperature of the melt | — 1100° C. |
| Duration of bonding process | — from one to 10 min |

When the apparatus of the invention is used for fabricating polymetallic articles from metals susceptible to bonding at a temperature of about 500° C. (aluminum, manganese and alloys thereof), that is at the melt temperature of 500° C., the potentialities of such apparatus, with regard to both the maximum permissible pressure and dimensions of the assembly, will substantially surpass those mentioned above.

The invention is illustrated by the following specific examples.

EXAMPLE 1

A two-layer sleeve of 120 mm in length, the outer layer of which is formed of a bronze tube having 50 mm in diameter and 2.5 mm in wall thickness, the inner layer thereof being formed of a steel tube of 45 mm in diameter and 7 mm in wall thickness were prepared for bonding in the following manner. First, the abutting surfaces of the parts making up the assembly were chemically treated and then inserted one into another, pushed through the ring on a press providing intimate contact of said parts with one another, using dry soap for lubrication, then joining the ends of the two-layer assembly by argon-arc welding (the joining by welding is necessary in such combination of materials, with bronze forming the outer layer, because of the increasing clearance between the abutting surfaces during their heating). The assembly was then heated in the apparatus of the invention shown in FIG. 1, containing the high-temperature melt 2 composed of salt NaCl, at a temperature of 820 ± 10° C., applying vapour pressure to the melt of 75 kg/cm$^2$, holding the assembly under pressure for 5 minutes, bringing pressure above the melt back to atmospheric, and then removing the bonded article from the melt to be thereafter washed by running water.

The flattening test of the rings cut from the bonded bimetallic sleeve showed high strength of the bond obtained by diffusion bonding process.

EXAMPLE 2

A three-layer tubular assembly of 400 mm in length, wherein the outer and inner layers are made of an alloy composed of aluminum, magnesium and manganese, and the intermediate layer, of aluminum, said tubular assembly being 76 mm in diameter and with the overall thickness of its wall of 11 mm, said assembly was prepared for bonding by mechanical treatment, pushing the coupled assembly through a calibration ring providing for intimate contact between the assembly parts. The ends of the three-layer tube were sealed by welding. The heating and diffusion bonding of the assembly were carried out by the apparatus of the invention shown in FIG. 2. A mixture of such salts as $KNO_3$ and $NaNO_3$ (50 percent of each) was used for the melt having a temperature of 500 ± 10° C.

The three-layer tubular assembly was immersed in the melt with a temperature of 500° C., building up by means of a compressor and applying to said melt an air pressure of 120 kg/cm$^2$, which was maintained for 7 minutes. The pressure was then brought back to atmospheric, the apparatus opened and the bonded polymetallic tube removed therefrom to be rinsed with running water.

Further testing showed high quality of the diffusion bonding process.

What is claimed is:

1. A method for fabricating polymetallic articles by a diffusion bonding process in a high-temperature melt, comprising the steps of: joining the parts of an assembly to be bonded with surfaces of the parts interfitting; holding said parts of the assembly in intimate contact; placing a high-temperature melt in a container immersing said assembly of parts in said high-temperature melt; heating said container so that said high-temperature melt is heated and said assembly is heated by said high-temperature melt; and clamping said assembly of parts in said high-temperature melt by applying water vapour pressure to said melt to thereby allow diffusion bonding thereof, the temperature of said container being sufficiently high to prevent condensation of said water vapour pressure on portions of said container.

2. A method as claimed in claim 1, wherein prior to being immersed in the high-temperature melt the parts of said assembly are held in intimate contact so that there is a clearance between said parts, said clearance being sufficiently small to prevent penetration of the melt between the interfitting surfaces of said parts.

3. A method as claimed in claim 1, wherein prior to being immersed in the high-temperature melt the assembly of said parts is joined in a fluid-tight manner throughout the perimeter of the interfitting surfaces thereof.

4. An apparatus adapted for connection to a liquid supply system for fabricating polymetallic articles by a diffusion bonding process in a high-temperature melt, comprising: a thermally insulated container adapted to receive a high-temperature melt and adapted to be sealed to form a closed container; a closed metallic accumulation vessel fitted at its upper portion with openings communicating said accumulator with the container interior for applying pressure to the melt; connection means adapted for connecting said accumulation vessel to a liquid supply system; and a heating means for maintaining a prescribed temperature of the melt in said container and for vapourizing liquid within said pressure accumulation vessel.

5. An apparatus as claimed in claim 4, wherein said container is cylindrical in shape and provided with a cover having mounted therein a portion of said connection means.

6. An apparatus as claimed in claim 4, wherein said container has a cover and said connection means includes a pipe, fixed in said cover and extending from said accumulator vessel to the liquid supply system.

7. A method for fabricating polymetallic articles by a diffusion bonding process in a high-temperature melt, comprising the steps of: joining the parts of an assembly to be bonded with surfaces of the parts interfitting; holding said parts of the assembly in intimate contact; placing a high-temperature melt in a container; immersing said assembly of parts in said high-temperature melt; heating said assembly in said high-temperature melt; positioning a metallic accumulation vessel in said container in such manner that an upper portion of the accumulation vessel communicates with an interior space in said container; heating said high-temperature melt thereby heating the assembly; supplying water to said accumulation vessel, said water being changed to water vapour by the temperature within said container thereby applying pressure to said melt and clamping said assembly of parts whereby said assembly is diffusion bonded.

8. An apparatus for fabricating polymetallic articles by a diffusion bonding process in a high-temperature melt comprising:
a cooled housing adapted to be sealed to form a closed container;
a melt container adapted to receive a high-temperature melt positioned within said cooled housing in such manner that a space is defined between the exterior of the melt container and walls of the cooled housing;
passage means for establishing communication between the interior of said melt container and said space;
means for applying pressure to melt received in said melt container, said passage means providing equalization of pressure on both sides of the walls of said melt container; and
heating means positioned in said space for heating said melt container and thereby heating said melt to a predetermined temperature.

9. An apparatus as claimed in claim 8, wherein said cooled housing is cylindrical in shape and fitted with a cover through which the melt container interior space communicates with the means for applying pressure to the melt.

10. An apparatus as claimed in claim 9, wherein the means for applying pressure to the melt is a high-pressure compressor.

* * * * *